United States Patent [19]

Bidwell et al.

[11] 4,045,235
[45] Aug. 30, 1977

[54] TREATMENT OF CLAY MINERALS

[75] Inventors: Jan Ivan Bidwell; Roger William Adams; Walter Brian Jepson, all of St. Austell, England

[73] Assignee: England Clays Lovering Pochin & Company, Limited, St. Austell, England

[21] Appl. No.: 628,526

[22] Filed: Nov. 3, 1975

Related U.S. Application Data

[63] Continuation-in-part of Ser. No. 350,395, April 12, 1973, abandoned.

[51] Int. Cl.$^2$ ............... C04B 33/13; C04B 33/04
[52] U.S. Cl. ................................. 106/72; 106/73; 106/308 B
[58] Field of Search .................. 106/72, 73, 308 B

[56] References Cited

U.S. PATENT DOCUMENTS

| 1,312,853 | 8/1919 | Kohler | 106/72 |
| 2,268,131 | 12/1941 | Barker et al. | 106/72 |
| 3,151,993 | 10/1964 | Bundy | 106/72 X |
| 3,326,705 | 6/1967 | Duke | 106/72 |
| 3,353,668 | 11/1967 | Duke | 106/72 X |
| 3,477,809 | 11/1969 | Bundy et al. | 106/72 X |

FOREIGN PATENT DOCUMENTS

| 1,228,538 | 4/1971 | United Kingdom | 106/72 |

*Primary Examiner*—Patrick P. Garvin
*Assistant Examiner*—William G. Wright
*Attorney, Agent, or Firm*—Armstrong, Nikaido & Marmelstein

[57] ABSTRACT

The rheological properties of a clay are improved by forming a mixture of an aqueous suspension of the clay at a pH in the range 5 to 9 and a weakly positively charged inorganic hydroxy polymer of aluminum in a quantity such that there is present in the mixture not more than 10 mg of aluminum per gram of clay.

20 Claims, 3 Drawing Figures

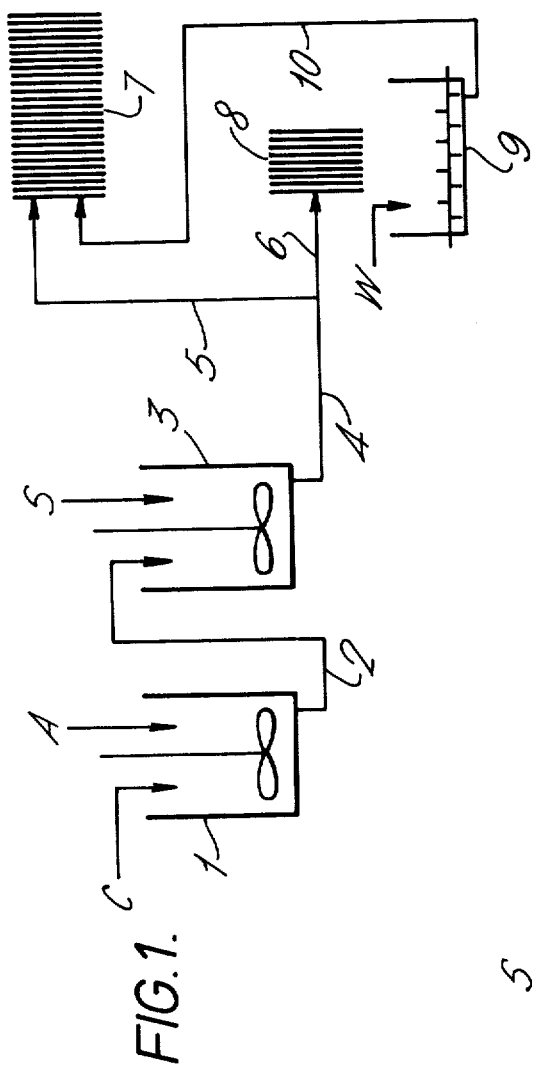
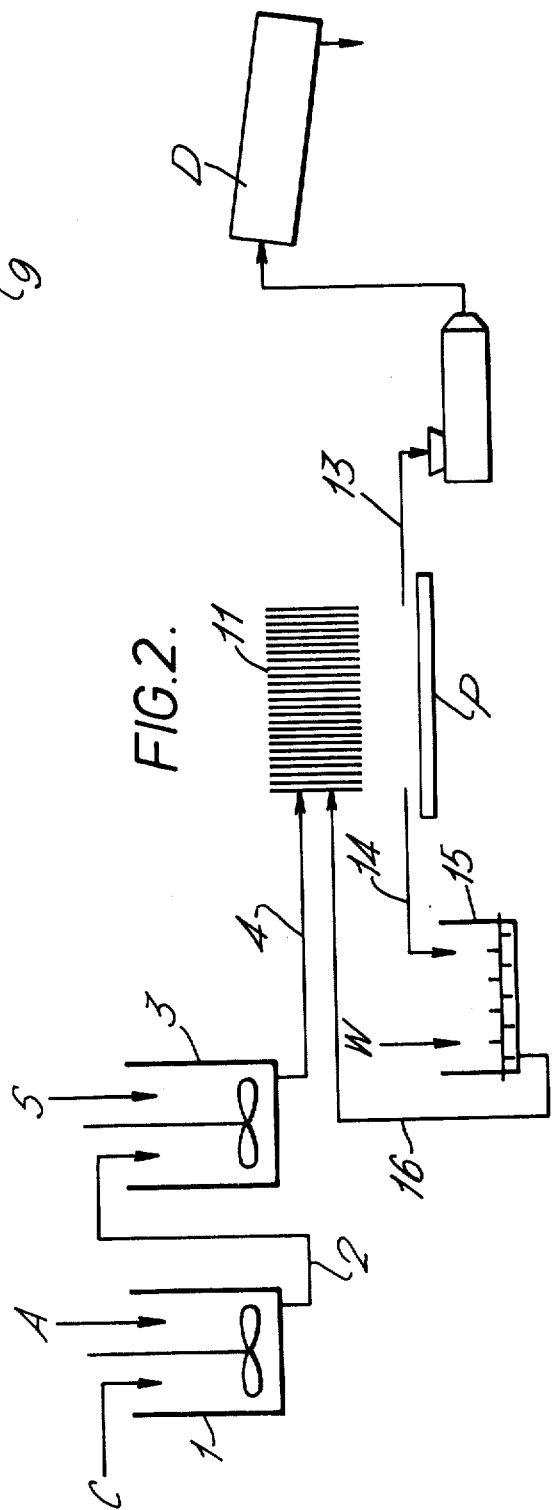
FIG.1.
FIG.2.

TREATMENT OF CLAY MINERALS

This application is a continuation-in-part application of our earlier U.S. patent application, Ser. No. 350,395, filed 12th Apr. 1973, now abandoned.

BACKGROUND OF THE INVENTION

This invention relates to the treatment of clay minerals and, more particularly, is concerned with a method of treating clay minerals in order to improve the rheological properties of the clay.

Clays for use in a slip casting process for manufacturing ceramic wares should form slips, or suspensions, in water which are sufficiently fluid to be poured, even when containing a high percentage by weight of solids, without requiring a large addition of a deflocculating agent, such as sodium silicate. The clay should also be such that when the casting slip is poured into a plaster mould to form a ceramic article, the water in the slip should flow rapidly through the walls of the mould and through the cake which is being formed on the walls of the mould.

Clays for use as pigments, for example for use in coating paper, must generally have good whiteness and fine particle size and, in addition, must have good rheological properties, e.g. they must be capable of forming an aqueous suspension of high solids content which can flow through a paper coating apparatus so that the minimum quantity of water has to be removed from the coated base paper by evaporation. In modern paper coating apparatus a paper coating composition is subjected to shear rates which may be as high as 10,000 sec $^{-1}$, or even higher, and it is important that the rheological properties of a coating pigment are such that the paper coating composition is still fluid under these conditions. It is also an important advantage if, when a paper coating pigment is made into a deflocculated aqueous suspension at a high solids content, it remains fluid even after storage for several days so that the pigment is capable of being transported in a slurry form and of being successfully pumped on arrival.

Also, one of the most commonly used methods of dewatering dilute aqueous suspensions of clay pigments is that of filtration, and it is important that the clay pigment should form a filtercake having good permeability so that it can be dewatered rapidly by this method. A clay pigment which forms a filtercake having poor permeability presents severe production problems due to the long time required for the filtration stage.

There are often found natural deposits of clays which have good whiteness and fine particle size, but which have inferior rheological properties so that they are unsuitable, for example, for use in slip casting processes or as paper coating pigments. It is clearly desirable to be able to improve the rheological properties of such clays in order to bring them to the standard required to make them suitable for use in slip casting processes or as paper coating pigments; and it is an object of the present invention to provide a method of treating a clay which has naturally poor rheological properties in order to obtain therefrom a material whose rheological properties are such as to make it useable as a paper coating pigment or in a slip casting process.

In British Patent Specification No. 1,228,538 there is disclosed a method of forming a coated kaolinite which has imporved physical characteristics, especially as regards its use in organic polymer systems, the method comprising forming a slurry of a kaolinite containing dissolved therein a compound or compounds capable of forming, either alone or in combination, an inorganic gel when the pH of the slurry is changed, and adjusting the pH of the slurry to form the inorganic gel and cause deposition of said gel on the surface of the kaolinite. The specification states that suitable inorganic gels are magnesium silicate, aluminum silicate, silica and alumina and the method is illustrated by a number of Examples, in one of which (namely Example 4) a kaolinite is treated with aluminum hydroxide in a quantity which exceeds 10 mg. of Al per g. of clay.

SUMMARY OF THE INVENTION

According to the present invention, there is provided a method of treating a clay in order to improve the rheological properties of the clay which method comprises the step of forming a mixture of an aqueous suspension of the clay at a pH in the range 5 to 9 and a weakly positively charged inorganic hydroxy polymer of aluminum in a quantity such that there is present in the mixture from 0.5 to 10.0 mg of aluminum per gram of clay, calculated on a dry weight basis.

It is believed that the weakly positively charged inorganic hydroxy polymer of aluminum is similar to gibbsite in structure but only one or two molecular layers thick. It is an aluminum-containing, salt-like inorganic polymer (which can be prepared in solid, slurry or solution form) comprising a range of different polymeric species in which the aluminum ions are partially hydrolysed by alkali and the average ratio of hydroxide ions to aluminum ions is in the range of from 0.5 to 2.8. The weakly positively charged inorganic hydroxy polymer of aluminum can be precipitated in situ in the mixture by mixing with the clay suspension a water-soluble salt of aluminum, the pH of the suspension at the time of addition of the water-soluble salt being such that the hydroxy polymer is not precipitated, and then adjusting the pH by the addition of a suitable alkali or acid, whichever is appropriate, to a value in the range of from 5 to 9, in order to precipitate substantially completely the desired hydroxy polymer of aluminum. Suitable alkalis and acids for this purpose are the carbonates or hydroxides of lithium, sodium and potassium, and sulfuric acid, hydrochloric acid and nitric acid. The inorganic aluminum hydroxy polymer which is obtained in this way can generally be represented by the formula: $Al(OH)_n (3-n)X^-$ where $0.5 \leq n \leq 2.8$ and $X^-$ is $Cl^-$, $NO_3^-$ or $\frac{1}{2}SO_4^{2-}$. The inorganic aluminum hydroxy polymer can be produced, for example, by titrating a solution of an aluminum salt with a base to a final OH/Al ratio of about 2.7:1; if aluminum sulphate and sodium hydroxide are used, one can write the reaction scheme as follows:

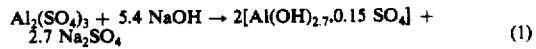

$$Al_2(SO_4)_3 + 5.4\ NaOH \rightarrow 2[Al(OH)_{2.7} \cdot 0.15\ SO_4] + 2.7\ Na_2SO_4 \quad (1)$$

and the aluminum hydroxy polymer reacts with the clay surface and displaces the exchange cations, which may be, for example, Na$^+$ ions, in accordance with the reaction scheme:

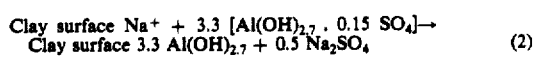

$$\text{Clay surface Na}^+ + 3.3\ [Al(OH)_{2.7} \cdot 0.15\ SO_4] \rightarrow \text{Clay surface } 3.3\ Al(OH)_{2.7} + 0.5\ Na_2SO_4 \quad (2)$$

When forming the inorganic hydroxy polymer of aluminum in situ, it is preferable, after adding the water-soluble salt of aluminum to the aqueous suspension of clay, to adjust the pH of the mixture to within the range of from 6.0 to 8.0 to bring about precipitation of the inorganic hydroxy polymer of aluminum.

Preferably, the amount of the inorganic hydroxy polymer of aluminum admixed with the aqueous clay suspension or formed in situ is such that there is present from 1.0 to 7.0 mg, and most advantageously from 1.0 to 4.0 mg, of aluminum per gram of clay, calculated on a dry weight basis. The optimum dose rate of the inorganic hydroxy-polymer of aluminum for a particular clay generally lies within the stated preferred range and can be determined by experiment. However, there should not be used a quantity of the inorganic hydroxy polymer of aluminum such that the amount of aluminum present exceeds 10 mg per gram of dry clay since the improvement in the rheological properties of the clay reaches a maximum at an aluminum dose which is less than 10 mg of aluminum per gram of dry clay, and the higher the aluminum dose the greater the amount of deflocculant which will be required subsequently to deflocculate the clay.

It is advantageous to subject the clay, as a plastic mass, to mechanical working, for example in a kneader, a pugmill or an edge-runner mill, for a time sufficient to dissipate in the plastic mass at least 50 horsepower hours of energy per long ton of dry clay ($1.3 \times 10^5$ joules/kg): this can be done either before or after the clay has been mixed with the water-insoluble, weakly positively charged inorganic hydroxy polymer of aluminum.

The aqueous clay suspension obtained on carrying out the method of the invention can be dewatered by conventional means, for example by filtration or in a centrifuge, to form a cake. The cake thus produced can be dried, if required, at a temperature which is preferably not greater than 120° C. It may be advantageous to wash the cake with clean water, e.g. river water or mains water, by reslurrying and dewatering the clay at least once before drying or using the clay in any way; such "clean" water should contain not more than 20 ppm of $Ca^{++}$ and $Mg^{++}$, not more than 20 ppm of $Na^+$ and not more than 20 ppm of silicates expressed as $SiO_2$. If one wishes to avoid the steps of reslurrying the cake in clean water and then refiltering, because such steps are cumbersome and expensive to carry out on a large scale, it is possible to prepare the inorganic hydroxy-polymer of aluminum separately from the clay suspension. The inorganic aluminum hydroxy polymer can be obtained as a precipitate by adding a solution of an alkali to a solution of a salt of aluminum. The precipitate is then dewatered and reslurried in clean water. The suspension of the inorganic hydroxy polymer of aluminum can then be mixed with the suspension of clay in the appropriate quantity and the pH adjusted, if necessary, to a value in the range of from 5 to 9. The resultant suspension can then be dewatered without any additional washing step.

An aqueous suspension of a clay to be treated by the method of the present invention preferably contains not more than 200 ppm., and most preferably contains not more than 50 ppm., of dissolved silica expressed as $SiO_2$. If it is required to treat a suspension of clay initially containing a larger concentration of dissolved silica, i.e. more than 200 ppm expressed as $SiO_2$, the clay suspension should be dewatered and redispersed in clean water before employing the method of the present invention.

Whilst the clay may be treated by the method of the inventon before it is subjected to a reductive bleaching process, it is advantageous to treat the clay by the process of the invention either concurrently with or subsequent to a reductive bleaching process such as that described in U.K. Patent Specification No. 520,498. In one procedure the clay, if not already in the form of a suspension, is first mixed with water to form a suspension; the solids content of the suspension is adjusted to lie in the range 5 to 20% by weight of solids; and the pH of the suspension is adjusted to lie in the range of from 2.5 to 5.5. The suspension is then treated with a water-soluble salt of aluminum, the pH is adjusted, if necessary, with a mineral acid or an alkali so as to lie in the range of from 2.5 to 3.0, and a reducing bleaching agent is added. The pH is then raised by the addition of a suitable alkali to a value in the range of from 5 to 9, and the suspension is filtered. The resulting filter cake is reslurried in fresh water, filtered again and the cake dried at a temperature not exceeding 120° C. In an alternative procedure, the pH of the clay suspension is first reduced to a value in the range of from 2.5 to 3.0, the reducing bleaching agent is then added, the pH preferably raised to a value in the range of from 3.0 to 5.5 and the water-soluble salt of aluminum is then added. The pH is then raised by the addition of a suitable alkali, the suspension is filtered, the cake is reslurried and filtered again, and the cake is then dried as described above. In a further alternative procedure, the pH of the clay suspension is first reduced to a value in the range of from 2.5 to 3.0, the water-soluble aluminum salt is then added, followed by the reducing bleaching agent. The pH is then raised by the addition of a suitable alkali, the suspension is filtered, the cake is reslurried and filtered again, and the cake is then dried.

Whichever procedure is adopted, it is disadvantageous to leave the clay suspension in the presence of the aluminum salt at a low pH, i.e. at a pH below 5.0 for longer than about 10 hours.

The process of the invention is particularly suitable for the treatment of kaolinitic clays, e.g. kaolin (also known as china clay), but it can also be used for other clays of the kandite group which comprises kaolinite, dickite, nacrite and halloysite. It may be noted here that it is apparently not the clay mineral itself, e.g. kaolinite, which is acted upon by the method of the invention but the impurities which are associated with the clay mineral, e.g. montmorillonite, thus improving the rheological properties of the mixture. Thus, the invention may be useful for improving the rheological properties of any clay of which the major constituent is a mineral of the kandite group but which also contains minor amounts of other minerals.

DESCRIPTION OF EMBODIMENTS

In a preferred embodiment of the invention, a suspension of the clay in water, the solids content of which is adjusted to be in the range 5 to 20% by weight of solids and the pH of which is adjusted to be in the range of from 2.5 to 5.5, is treated with a water-soluble salt of aluminum in a quantity such that there is present in the suspension from 1.0 to 7.0 mg. of aluminum per gram of dry clay. The pH of the suspension is then adjusted within a short time, by the addition of a suitable alkali, so as to be in the range of from 6 to 8. The aqueous suspension is then dewatered and the cake resulting therefrom is reslurried in clean water, and dewatered again. The dewatered clay is subjected to mechanical working before being dried, i.e. whilst in the form of a plastic mass, for a time sufficient to dissipate in the clay at least 50 horsepower hours of energy per long ton of clay (calculated on a dry weight basis). The dewatered and mechanically worked clay is then dried at a temperature not greater than 120° C.

The invention will now be illustrated by the following Examples. In the Examples the term "viscosity concentration" means the solids concentration, in % by weight of solids, of a fully deflocculated aqueous suspension of the clay which has a viscosity, at 22° C., of 5 poise, and in each case the determination of the viscosity concentration was performed in the following way: A sample of the clay was mixed (a) with sufficient water to give a suspension having a known solids content which is greater by about 2% by weight than that of a fully deflocculated suspension which would just flow from the end of a glass rod, and (b) with 0.25% by weight of a sodium polyacrylate deflocculant having a number average molecular weight of 1650, based on the weight of dry clay, the mixture being formed by agitation by means of a high speed mixer for a total of 20,000 revolutions. After mixing, a sample of the suspension was cooled to 22° C. and its viscosity measured by a Brookfield Viscometer using a speed of 100 r.p.m. and spindle 3, which combination of spindle and rotational speed gives a shear rate of 30 sec$^{-1}$. Sufficient water was then added to reduce the solids content of the suspension by about 2% by weight and the viscosity was measured again after correction of the temperature to 22° C. The solids content of the diluted suspension was checked by weighing a sample before and after evaporation to dryness. The reciprocal of the square root of the viscosity in poises is calculated for each solids content and the two points are plotted on a graph. By joining the two points with a straight line the solids content of the suspension which would have a viscosity of 5 poise at 22° C. can then be determined.

In most of the Examples deionized water was used in the test but instead of deionized water there can be used clean water as described above.

Examples 1 to 18 are principally concerned with the production of a clay suitable for use as a paper coating pigment whilst Examples 19 to 22 are principally concerned with the production of a clay suitable for use in a slip casting process.

FIG. 1 shows the apparatus used to treat the suspensions according to the method of the present invention.

FIG. 2 shows further apparatus for treating suspensions according to the method of the present invention.

EXAMPLE 1

Figure 3:
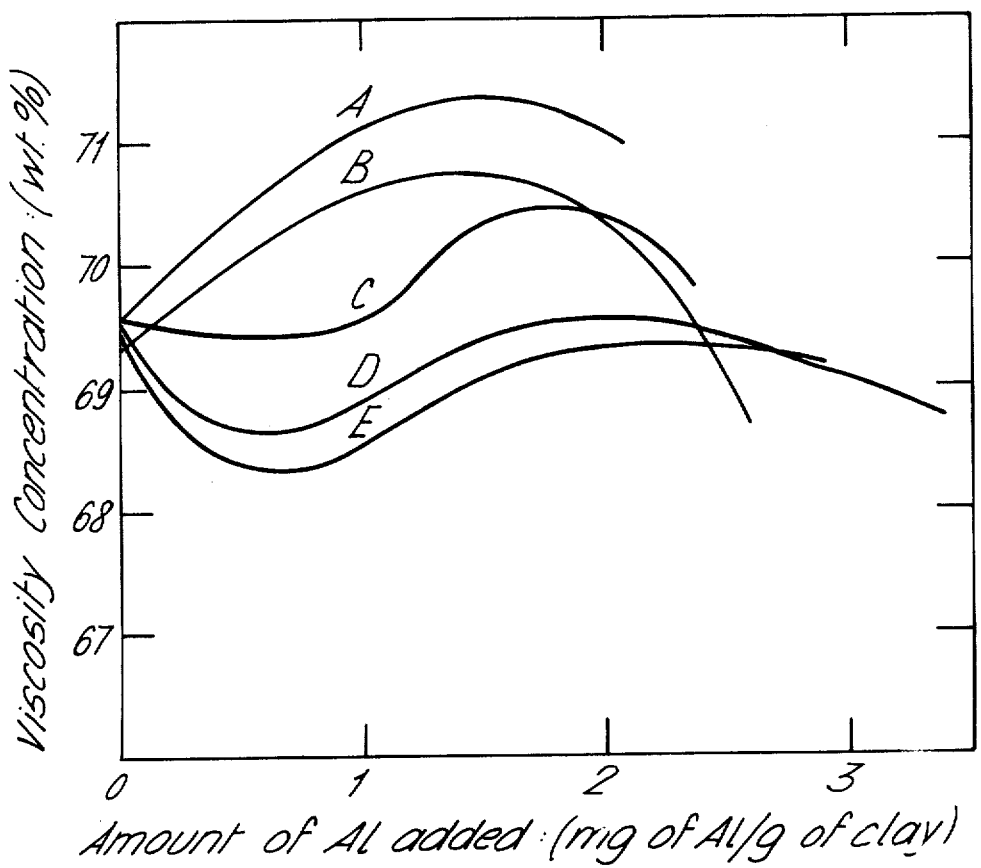
FIG. 3 shows the various viscosity concentrations corresponding to different aluminum doses according to the method of the present invention.

An English china clay, which had a particle size distribution such that 80% by weight consisted of particles smaller than 2 μm. equivalent spherical diameter but which had poor rheological properties, was slurried in water to form a suspension having a solids content of 10% by weight and a pH of about 4.5. An approximately 0.2M solution of aluminum sulphate was added, with stirring, in an amount sufficient to provide 1 mg. of aluminum per gram of dry clay. Shortly thereafter an approximately 1M solution of caustic soda was added with stirring until the pH of the suspension rose to 7.5. The suspension was then filtered to give a filterckae containing about 40% by weight of water. The cake was reslurried in deionized water to give a suspension containing 10% by weight of solids and the suspension was then filtered a second time. The cake was dried for 16 hours at 80° C. in a well ventilated oven and the viscosity concentration of the dry clay was measured. The procedure was repeated for different aluminum doses and the results obtained are given in Table 1 below:

Table 1

| Aluminum Dose (mg Al/g of clay) | Viscosity Concentration (wt.%) |
|---|---|
| 0 | 52.3 |
| 1.0 | 62.8 |
| 2.0 | 66.2 |
| 2.5 | 66.9 |
| 3.0 | 67.7 |
| 3.5 | 67.9 |
| 4.0 | 67.0 |

It can be seen that the viscosity concentration reached a maximum when the aluminum dose was about 3.5 mg of Al/g. of clay and began to decrease when the aluminum dose was increased beyond this optimum value.

EXAMPLE 2

An English china clay, having a particle size distribution such that 75% by weight consisted of particles smaller than 2 μm equivalent spherical diameter and fair rheological properties, was treated in the manner described in Example 1 and it was found that the optimum amount of aluminum to use was 1.5 mg. of Al per gram of dry clay. The procedure of Example 1 was then repeated using the optimum dose except that the final pH after adding the caustic soda was only 5.5. The treated clay was filtered, washed, filtered again and dried, as in Example 1, and viscosity concentration measured. The experiment was then repeated for different final pH values and the results obtained are given in Table 2 below:

Table 2

| Final pH | Viscosity Concentration (wt.%) |
|---|---|
| 5.5 | 69.2 |
| 6.0 | 69.7 |
| 6.5 | 70.5 |
| 7.0 | 70.3 |
| 7.5 | 70.5 |
| 8.0 | 69.9 |
| 9.0 | 69.3 |

It can be seen that the optimum final pH was around 6.5 to 7.5.

EXAMPLE 3

A suspension of the same English china clay as was used in Example 2 was divided into two portions, A and B. Portion A was treated exactly as in Example 1 and Portion B was treated as in Example 1 but the steps of slurrying the filtercake in deionized water and filtering a second time were omitted. The viscosity concentration of each sample of clay was measured and the results obtained are shown in Table 3 below.

Table 3

| Aluminum dose mg of Al/g of clay | Viscosity Concentration (wt.%) | |
|---|---|---|
| | Portion A | Portion B |
| 0 | 68.0 | 68.0 |
| 0.5 | 68.7 | 68.8 |
| 0.75 | 69.2 | 69.2 |
| 1.0 | 69.7 | 69.5 |
| 1.5 | 70.4 | 68.6 |
| 2.0 | 70.5 | 68.1 |
| 2.5 | 70.5 | — |

This shows that omitting the washing stages causes a decrease in the maximum viscosity concentration which can be obtained.

EXAMPLE 4

A suspension containing 10% by weight of an English china clay, having a particle size distribution such that 75% by weight consisted of particles larger than 2 microns equivalent spherical diameter and having fair rheological properties, was treated as described in Example 1, and it was found that the optimum dose of aluminum was 2 mg. of Al per gram of clay. Further samples of the same clay were slurried in water to form suspensions having different solids contents varying from 2.5 to 30% by weight and these were then treated as in Example 1 and the viscosity concentrations measured. The results are given in Table 4 below under the heading "Run 1".

A further series of suspensions of different solids content was prepared and the suspensions were then treated as in Example 1 except that the steps of reslurrying in deionized water and refiltering were performed two additional times, making three washing stages in all. The viscosity concentrations were measured and the results are given in Table 4 below under the heading "Run 2".

Table 4

| Solids Content (wt.%) | Viscosity Concentration (wt.%) | |
|---|---|---|
| | Run 1 | Run 2 |
| 2.5 | 70.9 | — |
| 5.0 | 70.5 | — |
| 10.0 | 70.8 | 71.1 |
| 15.0 | 70.2 | 71.0 |
| 20.0 | 70.4 | 71.2 |
| 25.0 | 69.5 | 70.8 |
| 30.0 | 69.0 | 70.7 |

It can be seen that if the aluminum-treated clay is washed very thoroughly the tendency for the viscosity concentration to decrease with increasing solids content is reduced significantly.

A third series of suspensions of the clay, all at 10% by weight of solids, was treated as in Example 1 except that the steps of reslurrying the cake in deionized water and refiltering were omitted and instead the cake was reslurried in solutions of sodium sulphate of varying concentrations. In each case the slurry was refiltered, the cake dried and the viscosity concentration of the dry clay measured. The results are given in Table 5 below:

Table 5

| Calculated Na+ on Clay (ppm)* | Viscosity Concentration (wt.%) |
|---|---|
| 73 | 70.0 |
| 106 | 69.6 |
| 153 | 69.4 |
| 166 | 69.2 |
| 189 | 69.1 |

*NB. This represents the number of grams of Na+ per 10⁶ grams of clay. These results show that the tendency for the viscosity concentration to decrease with increasing solids content is a function of the quantity of Na+ ion, or more generally alkali metal ion, adsorbed on the clay solids.

EXAMPLE 5

Six different samples of china clay, each of which had been refined to a particle size distribution such that 80% by weight consisted of particles smaller than 2 microns equivalent spherical diameter, were each slurried in water to give suspensions containing 10% by weight of solids. Each suspension was then divided into two portions, A and B.

Portion A in each case was adjusted to pH 4.5 and the permeability of the filtercake formed by filtration under a pressure difference of approximately 1 atmosphere was measured for each sample.

Portion B in each case was treated as in Example 1 to determine the optimum aluminum dose for each sample. Each suspension was then treated with aluminum sulphate solution at the optimum dose and a pH of about 4.5, and the pH was then adjusted to 7.5 with 1M caustic soda solution. The permeability of the filtercake formed by filtration under a pressure difference of approximately 1 atmosphere was then measured for each sample. The results are given in Table 6 below:

Table 6

| Sample No. | Permeability (cu.in/p.s.i./in³/hr. × 10⁴) | | Ratio: Permeability B / Permeability A |
|---|---|---|---|
| | Portion A | Portion B | |
| 1 | 40 | 180 | 4.5 |
| 2 | 120 | 180 | 1.5 |
| 3 | 80 | 250 | 3.1 |
| 4 | 100 | 290 | 2.9 |
| 5 | 220 | 685 | 3.1 |
| 6 | 440 | 930 | 2.1 |

It can be seen that treatment in accordance with the invention generally increases the permeability of the clay by a factor of 2 or more.

The apparatus for measuring permeability consisted of a Buchner funnel which was fitted into the neck of a clear glass cylindrical vessel with a side tube which was connected to a vacuum pump. A graduated cylinder was provided inside the clear glass cylindrical vessel to receive the filtrate passing through a filter medium in the Buchner funnel. The test was performed by pouring a volume of suspension on top of the filter medium container in the Buchner funnel, evacuating the clear glass cylindrical vessel and observing the volume of filtrate collected in the graduated cylinder after given intervals of time by means of a stop watch. A graph was then plotted of $t/V$ against $V$, where $V$ is the volume of filtrate collected after time, $t$. A straight line was obtained and the slope, $m$, was estimated.

The permeability, $p$, was calculated from the expression $$p = \frac{v}{2A^2 \cdot \Delta P \cdot m}$$

where
$\Delta P$ is the pressure drop across the filter medium and cake;
$A$ is the area of the filter medium; and
$V$ is the volume of cake deposited per unit volume of filtrate and is given by the expression $$v = \frac{\frac{1}{2.64} + \frac{W_c}{100 - W_c}}{\frac{W_s}{100 - W_s} - \frac{W_c}{100 - W_c}}$$

wherein
$W_c$ is the percentage by weight of water in the cake and
$W_s$ is the percentage by weight of water in the suspension.

EXAMPLE 6

100 tons of an English china clay which had been refined, using a sodium polyacrylate dispersing agent which had a number average molecular weight of 1650, to a particle size distribution such that 72% by weight consisted of particles smaller than 2 microns equivalent spherical diameter were slurried in water and the suspension was thickened by gravitational sedimentation to a solids content of 17% by weight. Samples of this suspension were treated in the laboratory as in Example 1 and it was found that the optimum aluminum dose was 3.0 mg of Al per gram of clay. The initial viscosity concentration of the untreated clay was 59.0% by weight and the maximum viscosity concentration obtained in the laboratory was 67.2% by weight.

The rest of the suspension was then treated in the apparatus shown in FIG. 1 of the accompanying drawings. The suspension entered a stirred tank 1 through a conduit C and an approximately 1M solution of aluminum sulphate was added through conduit A in an amount such that the aluminum dose was 3.0 mg. of Al per gram of dry clay (corresponding to 4256 lb of aluminum sulphate). The mixed suspension passed through a conduit 2 into a tank 3 to which there was also added sodium hydroxide through a conduit S until the pH was 7.5. The total amount of sodium hydroxide added was 160 lb. the clay suspension left tank 3 by way of a conduit 4 and was divided so that 75% passed along a conduit 5 to a filterpress 7 and 25% passed along a conduit 6 to a filterpress 8. The amount of suspension supplied to filterpress 7 filled only 75% of the total volume of the chambers of the filter press. The clay suspension in filterpress 8 was pressed first and the cake was dropped into a blunger, 9, where it was reslurried in clean water supplied through a conduit W to form a suspension containing 17% by weight of solids. This suspension was pumped through a conduit 10 to complete the filling of filterpress 7. The suspension was filtered and the cake dropped.

Ten filterpress cakes were selected at random and a total of 29 plug samples were taken from the 10 cakes, each sample being through the thickness of a single cake. The plug samples were dried at 80° C. for 16 hours and powdered and the viscosity concentration of each was measured. The mean value was 66.9% by weight which agreed well with the laboratory value of 67.2%.

A further suspension was prepared containing 100 tons of the same clay at 17% by weight of solids and was treated in the apparatus shown in FIG. 2 of the accompanying drawings. Samples of the suspension were first taken and treated in the laboratory as in Example 1 except that the steps of reslurrying in deionized water and refiltering were performed two additional times making three washing stages in all as in Run 2 of Example 4. The optimum viscosity concentration was found to be 69.0% by weight which was considerably better than the value of 67.2% by weight obtained in the laboratory after a single washing stage. The suspension was treated with aluminum sulphate in a stirred tank 1 and with caustic soda in a stirred tank 3 exactly as described with reference to the apparatus shown in FIG. 1. Sufficient suspension was then passed through a conduit 4 to fill a filterpress 11, the clay was filtered and the cakes dropped on to a platform P. 75% of the cakes were conveyed by route 13 to auger type pugmills and thence to a drier D and the remaining 25% were conveyed by route 14 to a blunger 15 where sufficient clean water was supplied through a conduit W to form a suspension containing 17% by weight of solids. In the next cycle of the filterpress 11 was filled three quarters full with treated suspension through conduit 4 and the remaining one quarter with clean suspension through a conduit 16. Again, after filterpressing, 75% of the cake was sent to the pugmills and dried and the remaining 25% reslurried with clean water. After the cycle of reslurrying part of the filtercake in clean water and refiltering had been performed three times, eight cakes were selected at random and a total of 21 plug samples were taken through their thicknesses. The viscosity concentration for each sample was determined as before and the mean value was found to be 68.3% by weight which is only slightly lower than the value for the sample treated in the laboratory.

EXAMPLE 7

A suspension containing 10% by weight of an English china clay, which had a particle size distribution such that 75% by weight consisted of particles smaller than $2\mu m$ equivalent spherical diameter, was treated as described in Example 1. The inital viscosity concentration of the clay was 66.6% by weight, the optimum aluminum dose was 1.5 mg. of Al per gram of dry clay, and the maximum viscosity concentration of the treated clay was 70.1% by weight.

In a further experiment the suspension was treated as in Example 1 except that the addition of 1M caustic soda solution was arrested when the pH had reached 4.5 and the suspension wan then left to stand for 48 hours. The addition of caustic soda solution was then continued until the pH was raised to 7.5 when the suspension was filtered and washed once in accordance with Example 1. The final viscosity concentration was 69.0% by weight.

In a third experiment the suspension was treated as in Example 1 except that after the addition of 1M caustic soda solution to bring the pH to 7.5, the suspension was left to stand at pH 7.5 for 48 hours before being filtered, washed, refiltered and dried. In this case the final viscosity concentration was 70.0% by weight so it is clear that holding the suspension at pH 4.5 for 48 hours has a harmful effect but holding the pH at 7.5 for 48 hours has no adverse effect.

EXAMPLE 8

A suspension containing 10% by weight of an English china clay, which had a particle size distribution such that 75% by weight consisted of particles smaller than 2 microns equivalent spherical diameter, was divided into five equal portions A, B, C, D and E. A sample of the suspension was found to contain 200 ppm. (200 grams per $10^6$ grams of aqueous solution) of dissolved silicate, expressed as $SiO_2$, in the aqueous phase.

Portion A was filtered and the cake reslurried in clean water to form a suspension having a solids content of 10% by weight and a pH of 4.5 to redue the silicate content. Additions of silicate, as sodium silicate, were made to portions C, D and E to give the silicate contents shown in Table 7 below:

Table 7

| Portion | Silicate Content of Aqueous phase (ppm. expressed as $SiO_2$) |
|---|---|
| A | 20 |
| B | 200 |
| C | 450 |
| D | 600 |

Table 7-continued

| Portion | Silicate Content of Aqueous phase (ppm. expressed as SiO$_2$) |
|---|---|
| E | 800 |

Each portion was treated as in Example 1 and the viscosity concentrations corresponding to different aluminum doses were determined and plotted graphically as curves A to E in FIG. 3 of the accompanying drawings. Portion A gave the best increase in viscosity concentration from 69.5% to 71.4% whilst portion B showed a smaller improvement to 70.8%. Portion C gave a still smaller improvement and Portions D and E showed no improvement at all. The optimum aluminum dose for portions C, D and E was greater than that for portions A and B. It can be seen that the silicate ion has an adverse effect on the response of the clay to treatment in accordance with the invention.

EXAMPLE 9

A sample of raw English china clay matrix was slurried in clean water and the resulting suspension was well mixed and divided into two portions, A and B. size distribution such that 80% by weight consisted of particles smaller than 2 microns equivalent spherical diameter, using as the deflocculant sodium silicate in an amount equivalent to 10 lb. of P60 sodium silicate per long ton of clay ("P60 sodium silicate" is a solution of waterglass having a specific gravity of 1.300). Portion B was refined to give a product having a particle size distribution such that 80% by weight consisted of particles smaller than 2 microns equivalent spherical diameter, using as the deflocculant a sodium polyacrylate having a number average molecular weight of 1,650 at a dose of 0.67 g. of dry deflocculant per kilogram of dry clay. Each portion was flocculated with sulphuric acid and allowed to thicken to a solids content of about 10% by weight. At this concentration Portion A contained 104 ppm. of SiO$_2$ in the aqueous phase.

Each portion was treated as in Example 1 and the maximum viscosity concentration was determined. In a further experiment a sample of Portion A at a concentration of 10% by weight of solids was filtered and the cake reslurried in clean water to give a suspension containing 10% by weight of solids. The suspension was then treated as in Example 1. The results are given in Table 8 below:

Table 8

| | Portion A | Portion B | Washed Portion A |
|---|---|---|---|
| Original viscosity concentration | 56.5 | 56.4 | 56.5 |
| Maximum viscosity concentration | 64.0 | 66.5 | 66.4 |

This shows that if the clay to be treated in accordance with the invention has been refined using sodium silicate as the deflocculant the clay should be washed before treatment. If a deflocculant is used which does not contain silicate the preliminary washing is not required.

EXAMPLE 10

A suspension containing 10% by weight of an English china clay which had a particle size distribution such that 75% by weight consisted of particles smaller than 2 microns equivalent spherical diameter and was treated by the method described in Example 1 but with the following changes:

1. after the aluminum sulphate solution had been added, sodium dithionite was added as a dilute solution and in an amount equivalent to 2.2 g. of sodium dithionite per kilogram of dry clay;
2. the suspension was left to stand for 15 minutes after adding the sodium dithionite in order to bleach the clay.

The pH of the suspension was then raised to 7.5 with caustic soda solution and the process completed as in Example 1. The maximum viscosity concentration was determined and the results are given in Table 9 below together with the results obtained by treating a sample of the same clay suspension exactly as in Example 1 and without the addition of sodium dithionite.

Table 9

| | With Dithionite | Without Dithionite |
|---|---|---|
| Original Viscosity Concentration | 63.9 | 63.9 |
| Maximum Viscosity Concentration | 69.1 | 69.2 |

The brightness of the clay was measured before and after treatment with the sodium dithionite as described above. As a control a further sample of the clay suspension was bleached with the same amount of dithionite but the aluminum sulphate addition was omitted. The results are given in Table 10 below:

Table 10

| | With Aluminum Sulphate | Without Aluminum Sulphate |
|---|---|---|
| Original reflectance to light of 458 nm. wavelength | 86.5 | 86.5 |
| Final reflectance to light of 458 nm. wavelength | 89.8 | 89.6 |
| Original reflectance to light of 574 nm. wavelength | 92.0 | 92.0 |
| Final reflectance to light of 574 nm. wavelength | 92.2 | 92.1 |

It is clear that treatment in accordance with the invention has not adversely affected the bleaching process.

EXAMPLE 11

A suspension of the same clay as was used in Example 1 was divided into two portions A and B. Portion A was treated as in Example 1 and after the second filtration step part of the cake was dried at 80° C. and the dry clay combined with the remainder of the cake to give a material containing 28% by weight of water. Portion B was filtered without preliminary treatment in accordance with the invention and part of the cake was dried and the dry clay mixed with the remainder of the cake to give a material again contaning 28% of water. The plastic masses obtained from Portions A and B were then subjected to different amounts of mechanical work in an auger-type pugmill and the viscosity concentrations of the treated clays were measured. The results are given in Table 11 below:

Table 11

| Work input | | Viscosity Concentration (wt. %) | |
|---|---|---|---|
| hp-hr.ton$^{-1}$ | joules/Kg. × 10$^4$ | A | B |
| 0 | 0 | 67.8 | 52.4 |
| 30 | 7.9 | 69.3 | 60.9 |
| 60 | 15.9 | 70.0 | 63.8 |

Table 11-continued

| Work input | | Viscosity Concentration (wt. %) | |
|---|---|---|---|
| hp-hr.ton$^{-1}$ | joules/Kg. × 10$^4$ | A | B |
| 90 | 23.8 | 70.3 | 64.7 |

This shows that treatment in accordance with this invention gives a better improvement in rheological properties than conventional treatment in an auger-type pugmill and also that a further improvement in rheological properties may be obtained by subjecting a sample of clay which has been treated in accordance with the invention to mechanical work in an auger-type pugmill.

EXAMPLE 12

A suspension containing 10% by weight of an English china clay having a particle size distribution such that 75% by weight consisted of particles smaller than 2 microns equivalent spherical diameter was divided into two portions, A and B. Portion A was treated as in Example 1, the aluminum dose being 2 mg. of Al per gram of dry clay, and was then divided into two sub-portions, A1 and A2.

Sub-portion A2 and Portion B were then filtered, partly dried and treated in an auger-type pugmill as in Example 11 but with a work input of 13.2 × 10$^4$joules/Kg(50hp-hr.ton$^{31}$ $^1$) The viscosity concentrations of the original clay, subportion A1, sub-portion A2 and Portion B were then measured. Each suspension which had been used in the viscosity concentration tests was then diluted with water until the viscosity was 200 cp. Each suspension was then left to stand undisturbed in a beaker for 1 week and the viscosities of the suspensions were measured again. The results are given in Table 12 below.

Table 12

| Clay | Viscosity Concentration (wt.%) | Increase in viscosity in one week (cp.) |
|---|---|---|
| Original | 66.7 | 150 |
| A1 | 69.6 | 100 |
| A2 | 71.2 | 620 |
| B | 68.8 | 640 |

The treated clay A1 is slightly more stable than the original clay and the clay A2 which has been treated according to the invention and then subjected to pugmilling shows about the same increase in viscosity as the original clay which has been subjected to pugmilling.

EXAMPLE 13

A sample was taken of an English china clay which had a particle size distribution such that 80% by weight consisted of particles smaller than 2 microns equivalent spherical diameter and which had been dried to a water content of 10.8% by weight. Part of this sample was dried at 80° C. to zero water content and the remainder was slurried in water to form a suspension containing 10% by weight of water and was treated as in Example 1 at an aluminum dose of 2 mg of Al per gram of dry clay. The aluminum-treated clay was divided into two parts the first part of which was dried at 80° C. to 10% water and the second part dried at 80° C. to zero water.

Each clay sample was then mixed with water containing 0.25% by weight of tetrasodium pyrophosphate and 0.05% by weight of a sodium polyacrylate dispersing agent having a number average molecular weight of 1650, the quantity of each dispersing agent being based on the weight of dry clay, and the resulting mixtures were agitated in a laboratory turbine mixer manufactured by Etablissement Cellier S.A. The pH of each of the suspensions was 7.5. At intervals, measurements were made of the solids content, the temperature and the viscosity of the suspension. No difference in behaviour could be detected between the treated moist clay and the treated clay which had been dried to zero water content and both suspensions had a lower viscosity at a given solids content than the untreated clay.

The suspension of the treated clay which had been dried only until its water content was 10% by weight was diluted with water until the viscosity was 200 cp. The suspension was then left to stand undisturbed in a beaker for 1 week and the viscosity was measured again. The increase in viscosity was only 150 cp.

EXAMPLE 14

An English china clay having a particle size distribution such that 71% by weight consisted of particles smaller than 2 microns equivalent spherical diameter was divided into two portions. The first portion was slurried in water and treated as in Example 1, the aluminum dose being 1.5 mg. of Al per gram of dry clay. After the second filtration step part of the treated clay was dried and the dry clay mixed with the filtercake to give a material having a moisture content of 28% by weight. Samples of this material were subjected to different amounts of mechanical work in an auger-type pugmill. The second portion of clay was slurried in water and the water content was adjusted to 28% by weight by the method described for the first portion. Samples of this material were also subjected to different amounts of mechanical work in an auger-type pugmill.

Each sample from both portions was slurried in water containing 0.25% by weight of tetrasodium pyrophosphate and 0.05% by weight of a sodium polyacrylate dispersing agent having a number average molecular weight of 1650, both based on the weight of dry clay, to give a suspension containing 65% by weight of solids. The viscosity of each suspension was measured with a Ferranti-Shirley plate and cone viscometer at a shear rate of 11,200 sec. $^{-1}$ and graphs were plotted of viscosity against work input. It was observed that the treated clay gave consistently lower viscosities than the untreated clay. Representative figures taken from the graphs are given in Table 13 below:

Table 13

| Work input | | Viscosity at Shear Rate of 11,200 sec.$^{-1}$(cp.) | |
|---|---|---|---|
| (hp-hr per ton$^{-1}$) | (joules/Kg × 10$^4$) | Clay | |
| | | Treated | Untreated |
| 30 | 7.9 | 130 | 185 |
| 50 | 13.2 | 75 | 105 |
| 70 | 18.5 | 40 | 70 |

EXAMPLE 15

A sample of raw English china clay matrix was refined in the laboratory using sodium silicate as the deflocculant, filtered and reslurried in deionized water to give a suspension containing 10% by weight of solids. The suspension was divided into two portions A and B. Portion A was treated as in Example 1 and the viscosity concentration was measured for various aluminum doses. The results are given in Table 14 below:

Table 14

| Aluminum Dose (mg of Al/g. of clay) | Viscosity Concentration (wt. %) |
| --- | --- |
| 0 | 52.5 |
| 1.0 | 58.5 |
| 2.0 | 63.0 |
| 3.0 | 66.1 |
| 3.5 | 66.1 |

Portion B was treated by adding approximately 1M caustic soda solution to raise the pH of the suspension to 11.8. A solution of sodium aluminate was prepared by adding 1M caustic soda solution to 0.2M aluminum sulphate solution until the precipitate which first formed redissolved. The pH of this solution was 11.8. The sodium aluminate solution was then added to the clay suspension with stirring in an amount sufficient to give an aluminum dose of 3 mg. of Al per gram of clay. Next, 1M sulphuric acid solution was added with stirring until the pH of the suspension was reduced to 7.5. Finally, the suspension was filtered and the cake reslurried in deionized water at 10% by weight of solids. The suspension was filtered a second time the cake dried and the viscosity concentration of the clay measured. The experiment was repeated using different aluminum doses and the results are given in Table 15 below:

Table 15

| Aluminum Dose (mg of Al/g. of Clay) | Viscosity Concentration (wt. %) |
| --- | --- |
| 0 | 52.5 |
| 3.0 | 62.3 |
| 3.5 | 62.4 |
| 4.0 | 64.3 |
| 4.7 | 62.0 |

Comparing the results of Tables 14 and 15 it can be seen that a useful improvement in the viscosity concentration can be obtained when the aluminum is added in the form of the aluminate ion rather than the aluminum ion, but the improvement is not quite so great as in the case of the aluminum ion.

EXAMPLE 16

A suspension was prepared containing 10% by weight of an English china clay which had a particle size distribution such that 80% by weight consisted of particles smaller than 2 microns equivalent spherical diameter. The suspension was divided into 3 portions A, B and C, which were treated as follows:

Portion A was treated as in Example 1 using various aluminum doses and the viscosity concentration was measured for each aluminum dose.

Portion B was first adjusted to pH 7.5 by adding 1M caustic soda solution. A suspension of aluminum hydroxy-polymer was prepared by adding 1M caustic soda solution to 0.2M aluminum sulphate solution until the pH rose to 7.5. The aluminum hydroxy-polymer was then filtered and reslurried in deionized water. After adding the aluminum hydroxy-polymer suspension to the clay suspension the pH of the suspension was raised to 7.5 again by adding a further small dose of 1M caustic soda solution. The slurry was then filtered and the clay dried without any intermediate washing stage. The viscosity concentration of the treated clay was measured and the experiment was then repeated using different aluminum doses.

Portion C was first adjusted to pH 4.5 and there was added to this clay suspension a suspension of aluminum hydroxy-polymer which had been prepared by adding 1M caustic soda solution to 0.2M aluminum sulphate solution until the pH rose to 4.5 and then filtering the suspension and reslurrying the aluminum hydroxy-polymer in deionized water. The amount of aluminum hydroxy-polymer was sufficient to give an aluminum dose of 2.0 mg. per gram of dry clay. Next 1M caustic soda solution was added to raise the pH to 7.5 after which the slurry was filtered and the clay dried without any intermediate washing step. The viscosity concentration of the treated clay was measured and the experiment was then repeated using different aluminum doses.

The results are given in Table 16 below:

Table 16

| Aluminum Dose (mg. of Al/g. of clay) | Viscosity Concentration (wt.%) | | |
| --- | --- | --- | --- |
| | Portion A | Portion B | Portion C |
| 0 | 58.8 | 58.8 | 58.8 |
| 2.0 | 68.1 | 65.0 | 67.2 |
| 2.5 | 68.1 | 65.7 | 67.6 |
| 3.0 | 67.5 | 65.0 | 65.3 |

These results show that similar results are obtained whether the aluminum hydroxy-polymer is prepared in the presence of the clay or is added in the form of a prepared slurry. If the aluminum hydroxy-polymer is added separately it is preferable to add it to the clay at a pH of 4.5 and then to raise the pH to 7.5.

EXAMPLE 17

For four samples of sedimentary kaolin, A, B, C and D, from various locations in Georgia the optimum amount of aluminum to be used was determined by the method described in Example 1. The procedure of Example 1 was then performed using the optimum dose. The treated clay was filtered, washed, filtered again and dried, as in Example 1, and the viscosity concentration in each case measured.

The results are given in Table 17 below:

Table 17

| Kaolin | % by weight smaller than 2 μm e.s.d. | Initial viscosity concentration (wt. %) | Optimum dose of Al³⁺ (mg./g) | Final viscosity concentration |
| --- | --- | --- | --- | --- |
| A | 81 | 66.7 | 2.0 | 71.1 |
| B | 83 | 68.1 | 2.0 | 71.1 |
| C | 84 | 72.0 | 1.0 | 73.8 |
| D | 83 | 70.3 | 1.5 | 72.6 |

These results show that Georgia Kaolins, which are sedimentary as compared with English china clay which are found in primary deposits, also respond to treatment in accordance with the invention.

The products of treating kaolins A and B in accordance with the invention were subjected in the form of a plastic mass to mechanical working in an auger type pugmill and the viscosity concentration of each worked product was measured. The amount of energy dissipated in the auger type pugmill and the final viscosity concentration in each case are shown in Table 18 below:

Table 18

| Kaolin | Energy dissipated in kaolin | | Final viscosity concentration (wt.%) |
| --- | --- | --- | --- |
| | (hp-hr. per ton⁻¹) | (joules/ kg × 10⁴) | |
| A | 78 | 20.6 | 71.3 |

Table 18-continued

| Kaolin | Energy dissipated in kaolin | | Final viscosity concentration (wt.%) |
|---|---|---|---|
| | (hp-hr. per ton$^{-1}$) | (joules/ kg × 10$^4$) | |
| B | 61 | 16.1 | 71.5 |

These results show that a further small increase in viscosity concentration may be achieved when Georgia Kaolin treated in accordance with the invention is subjected to a subsequent mechanical working step.

EXAMPLE 18 (Comparison)

An English China Clay having a particle size distribution such that 79% by weight consisted of particles smaller than 2 μequivalent spherical diameter was treated in the manner disclosed in Example 4 of British Patent Specification No. 1,228,538. A sample of the dry clay (500 g) was slurried in water (1.5 liters) and to this slurry was added aluminum sulphate (65 g. of Al$_2$(SO$_4$)$_3$ 18H$_2$O) in water (650 ml). The amount of aluminum sulphate added was equivalent to 10.5 mg of Al$^{3+}$/g of clay. After 10 minutes of mixing the pH was 3.3. Ammonium hydroxide (250 ml of 10%) was added to bring the pH to 7.5 to form an aluminum hydroxide gel which coated the kaolinite particles. The slurry was filtered and the gel-coated clay washed twice with deionised water and then dried overnight at 90° C.

A second sample of the same English China Clay was treated in accordance with the present invention, in the manner described in Example 1, the amount of aluminum sulphate which was added being that sufficient to provide 2 mg of Al$^{3+}$ per gram of dry clay.

The viscosity concentration of the dry clay treated by each of the two methods and also of the dry untreated clay was measured, using as the deflocculant a mixture comprising 0.25% by weight of tetrasodium pyrophosphate and 0.05% by weight of a sodium polyacrylate deflocculant having a number average molecular weight of 1650 the quantity of each deflocculant being based on the weight of dry clay. The rheological stability of an aqueous suspension of each of the three samples was determined by diluting the suspension which had been used in the viscosity concentration test with water until its viscosity was 200 cp. Each suspension was then left to stand undisturbed in a beaker for one week and the viscosities of the suspensions were measured again. The results are given in Table 19.

Table 19

| Aluminum dose (mg Al$^{3+}$/g of clay) | Viscosity Concentration (wt.%) | Increase in viscosity in one week (cp) |
|---|---|---|
| 0 | 66.7 | 92 |
| 2 | 71.0 | 37 |
| 10.5 | 42.1 | 500 |

These results show that treatment of the clay in accordance with the invention using 2 mg of Al$^{3+}$/g of clay yields a useful improvement in both viscosity concentration and rheological stability. However, if the same clay is treated with 10.5 mg of Al$^{3+}$/g of clay in the manner described in British Patent Specification No. 1,228,538 both the viscosity concentration and rheological stability are considerably worse than when the clay is in the untreated state.

The viscosity concentration of the sample treated with 10.5 mg of Al$^{3+}$/g of clay may be improved by adding a larger quantity of deflocculant, the maximum improvement which can be obtained being when the amount of deflocculant is 1.25% by weight of dry clay. Even with a deflocculant addition at this level the viscosity concentration is only 64.4% by weight which is less than that of the untreated sample and the increase in viscosity in one week is 1,585 cp. which is unacceptably high.

In the following Examples 19 to 22, the casting concentration, casting rate and modulus of rupture of the various products were measured, the values of these parameters being determined as follows:

a. Casting Concentration

The clay is dried at a maximum temperature of 60° C to a moisture content in the range of from ½ to 2% by weight of water and the incompletely dried clay is crushed to pass through a No. 10 mesh B.S. sieve (nominal aperture 1.676 mm). The amount of incompletely dried clay which is equivalent to 250 g. of bone dry clay is then added slowly to sufficient distilled water to form a slip having a solids content about 1% by weight greater than that which is estimated by previous experience to be the casting concentration of the clay. Stirring with a glass rod is done as little as possible and additions of a solution of sodium silicate in steps of 0.2 ml are made, as required, to keep the viscosity from rising above about 40 poise, which is the viscosity at which the slip will just flow from the end of the glass rod. The solution of sodium silicate is prepared by making up 50g of P84 sodium silicate to 100 ml distilled water (P84 sodium silicate has a typical analysis of 9.35% Na$_2$O, 30% SiO$_2$ and 60.65% H$_2$O; the mean molecular ratio of SiO$_2$ to Na$_2$O is 3.3:1). If all the clay has not yet been added and the addition of 0.2 ml of the sodium silicate solution does not make an appreciable difference to the fluidity of the slip, distilled water is added, as necessary, in steps of 1 ml in order to reduce the percentage by weight of solids. When all the clay has been added a slip should result which is still not fully deflocculated. This slip is left to stand for 30 minutes in a beaker covered to minimise loss of water by evaporation. At the end of this time the slip is stirred lightly to ensure that no undispersed clay remains and the viscosity of the slip is measured with a Brookfield viscometer using Spindle No. 3 at 20 r.p.m., the reading being noted after the 5th revolution. Further additions of 0.2 ml of sodium silicate solution are made at five minutes intervals, the slip being lightly stirred with the glass rod and the viscosity measured after each addition. Additions of sodium silicate solution are continued until a further addition of 0.2 ml fails to reduce the viscosity or even causes a slight increase. The minimum viscosity should be about 5 poise if the procedure given above has been carefully followed. Distilled water is then added in steps of 1 ml, the viscosity being measured after each addition, until the viscosity is 5 poise. The total amount of water in the slip is then used to calculate the percentage by weight of clay in the slip having a viscosity of 5 poise. This value is referred to as the "casting concentration."

b. Casting Rate

The temperature of the 5 poise viscosity casting slip prepared as described above is measured and casts are made by pouring portions of the slip into cylindrical plaster moulds of height 5 cm and diameter 5 cm. The portions of slip are allowed to remain in the moulds for 5, 10 and 20 minutes respectively after which times the surplus slip is poured away, the cast is dried and the thickness of the wall of the dry cast is measured half way along the curved surface of the cylinder. The square of the thickness is proportional to the time and a graphical plot of the square of the thickness against time gives a straight line, the gradient of which is called the "casting rate" and has the dimensions of mm$^2$min$^{-1}$. The casting rate at temperature$t°$ C is corrected to a casting rate at 20° C by multiplying the casting rate at $t°$ C by the factor, R, where $$R = \frac{\text{Viscosity of water at } t° \text{ C}}{\text{Viscosity of water at } 20° \text{ C}}$$

c. Modulus of Rupture 150g of dry clay is mixed with water until fully dispersed to give a suspension having a solids content in the range from 25to 50% by weight of solids. This suspension is poured through a No. 120 mesh B.S. sieve (nominal aperture 0.124 mm) and is then de-aired by being poured into a vacuum filtration flask which is evacuated to a pressure not exceeding 1in of mercury. The de-aired suspension is then carefully poured onto a filter paper on a Buchner funnel and dewatered to a plastic condition and the plastic filter cake is hand-worked to bring it into a condition suitable for extrusion, care being taken to ensure that air is not re-introduced during these operations. The plastic clay is then extruded to form rods of length 12 in (30.5 cm) and diameter ¼in (0.625 cm). The rods are air dried for 16 hours and then dried in an oven at 60° C for a few hours. Finally the dried rods are conditioned for 16 hours in a cabinet containing air at 80% relative humidity. A rod is tested for modulus of rupture by supporting it upon two knife edges a distance P cm apart and applying to a point midway between the knife edges a steadily increasing load. This steadily increasing load is applied by running water at a steady slow rate into a counterpoised beaker. The weight of water in the beaker at the instant when the rod breaks gives the load, L Kg, which is sufficient to cause rupture of the rod.

The modulus of rupture is calculated from the expression $$\text{Modulus of Rupture} = \frac{8PL}{\Pi D^3} \text{ Kg}f/\text{cm}^2$$

where $D$ is the diameter of the rod in cm.

EXAMPLE 19

An English kaolin having a particle size distribution such that 41% by weight consisted of particles having an equivalent spherical diameter smaller than 2 microns was mixed with water in the proportions 1 Kg. of dry kaolin to 9 liters of water, the mixture being stirred continuously to form a suspension containing 10% by weight of dry clay. A quantity of aluminum sulphate, $Al_2(SO_4)_3$ 16 $H_2O$, equivalent to 0.5 mg of aluminum per gram of dry kaolin was added to the suspension with continuous stirring and sodium carbonate solution was added dropwise to keep the pH steady at 6.7 for 5 to 10 minutes. The suspension of treated kaolin was then filtered, the filter cake reslurried in deionised water to form a suspension containing 10% by weight of dry kaolin, the suspension filered again and the cake dried at a temperature not exceeding 60° C until the moisture content was in the range from ½ to 2% by weight. The casting concentration, the amount of P84 sodium silicate required for minimum viscosity and the casting rate were measured.

The above procedure was then repeated but using quantities of aluminum sulphate equivalent to 1.0 mg, 1.5 mg, 2.0 mg, 7.0 mg and 10.0 mg per gr. of dry kaolin respectively. Finally the procedure was repeated but with no addition of aluminum sulphate.

The results are set out hereinafter in Table 20.

EXAMPLE 20

The experiment described in Example 19 was repeated but using an English kaolin suitable for use in the ceramic industry which had a particle size distribution such that 59% by weight consisted of particles having an equivalent spherical diameter smaller than 2 microns.

The results are set out hereinafter in Table 21.

EXAMPLE 21

The experiment described in Example 19 was repeated but using an English kaolin suitable for use in the ceramic industry which had a particle size distribution such that 23% by weight consisted of particles having an equivalent spherical diameter smaller than 2 microns.

The results are set out hereinafter in Table 22.

The sample of kaolin which had been treated with 1 mg of aluminum per g. of dry kaolin was adjusted to have a water content of 28% by weight and portions of the plastics mass thus formed were subjected to mechanical work in an auger-type pugmill, varying amounts of energy being dissipated in the plastics mass.

Each of the mechanically worked portions were tested for casting concentration, the amount of P84 sodium silicate for minimum viscosity, the casting rate and the modulus of rupture at 80% relative humidity.

The results are set out hereinafter in Table 23.

It will be observed that mechanical working of the kaolin which had been treated with the aluminum hydroxy-polymer improved the modulus of rupture and gave a further increase in casting concentration at the expense of a higher deflocculant demand and lower casting rate.

EXAMPLE 22

An English kaolin suitable for use in the ceramics industry had a particule size distribution such that 39% by weight consisted of particles smaller than 2 microns. The kaolin was mixed with water to form a suspension containing 10% by weight of dry kaolin and the suspension was divided into five portions, four of which were treated with varying amounts of a solution of aluminum nitrate such that there were added to the portions 0.5 mg, 1.0 mg, 2.0 mg, 4.0 mg, 7.0 mg and 10.0 mg of aluminum per g. of dry kaolin respectively. No addition of aluminum nitrate was made to the fifth portion. The pH of each of the five portions was adjusted to 7.5 with hydroxide solution and each portion was filtered, the cake reslurried in deionised water, the resultant suspension filtered a second time and the cake dried at 80° C. The portions of dried clay were tested for casting concentration and casting rate.

The results are set out hereinafter in Table 24.

TABLE 20

| | Aluminum addition(mg/g.dry kaolin) | | | | | |
|---|---|---|---|---|---|---|
| | 0 | 0.5 | 1.0 | 1.5 | 2.0 | 7.0 | 10.0 |

Casting

TABLE 20-continued

| | Aluminum addition(mg/g.dry kaolin) | | | | | | |
|---|---|---|---|---|---|---|---|
| | 0 | 0.5 | 1.0 | 1.5 | 2.0 | 7.0 | 10.0 |
| Concentration (% by wt. of solids) | 65.1 | 66.9 | 67.1 | 67.3 | 67.5 | 57.2 | 48.0 |
| Amount of P84 sodium silicate for minimum viscosity (g. P84 per 100g of kaolin). | 0.40 | 0.40 | 0.40 | 0.44 | 0.52 | 1.4 | 2.3 |
| Casting Rate (mm²min⁻¹) | 1.69 | 2.12 | 3.06 | 3.1 | 4.75 | — | — |

TABLE 21

| | Aluminum addition(mg/g.dry kaolin) | | | | | | |
|---|---|---|---|---|---|---|---|
| | 0 | 0.5 | 1.0 | 1.5 | 2.0 | 7.0 | 10.0 |
| Casting Concentration (% by wt. of solids) | 61.6 | 62.4 | 65.3 | 65.7 | 65.9 | 54.2 | 44.2 |
| Amount of P84 sodium silicate for minimum viscosity (g. P84 per 100g of kaolin). | 0.48 | 0.48 | 0.48 | 0.52 | 0.60 | 1.6 | 2.5 |
| Casting Rate (mm²min⁻¹) | 1.1 | 1.1 | 1.2 | 1.2 | 1.37 | — | — |

TABLE 22

| | Aluminum addition(mg/g.dry kaolin) | | | | | | |
|---|---|---|---|---|---|---|---|
| | 0 | 0.5 | 1.0 | 1.5 | 2.0 | 7.0 | 10.0 |
| Casting Concentration (% by wt. of solids) | 64.3 | 65.2 | 65.9 | 64.4 | 63.5 | 48.5 | 36.2 |
| Amount of P84 sodium silicate for minimum viscosity (g. P84 per 100g of kaolin). | 0.36 | 0.36 | 0.44 | 0.60 | 1.04 | 3.5 | 4.5 |
| Casting Rate (mm²min⁻¹) | 6.8 | 9.8 | 11.9 | 15.6 | 27.9 | — | — |

TABLE 23

| | Amount of energy dissipated in kaolin | | | | |
|---|---|---|---|---|---|
| (hp-hr.ton⁻¹) | 0 | 9.2 | 26.8 | 44.5 | 93.5 |
| (JKg⁻¹ × 10⁴) | 0 | 2.4 | 7.1 | 11.8 | 24.7 |
| Casting Concentration (% by wt. of solids.) | 65.9 | 68.4 | 69.8 | 71.1 | 71.8 |
| Amount of P84 sodium silicate for minimum viscosity(g.P84 per 100g. of kaolin). | 0.44 | 0.48 | 0.40 | 0.48 | 0.60 |
| Casting Rate (mm²min⁻¹) | 11.9 | 2.1 | 2.1 | 1.6 | 1.35 |
| Modulus of Rupture at 80% RH (Kgf. cm⁻²). | 1.9 | 3.2 | 3.7 | 4.7 | 6.4 |

TABLE 24

| | Aluminum addition (mg/g.dry kaolin) | | | | | | |
|---|---|---|---|---|---|---|---|
| | 0 | 0.5 | 1.0 | 2.0 | 4.0 | 7.0 | 10.0 |
| Casting Concentration (% by wt. of solids). | 65.5 | 67.9 | 68.5 | 68.0 | 65.7 | 58.6 | 48.6 |
| Casting Rate (mm²min⁻¹) | 1.94 | 2.74 | 2.45 | 3.21 | 5.04 | — | — |

We claim:

1. A method of treating a clay in order to improve the rheological properties of the clay which method comprises forming a mixture of (i) an aqueous suspension of the clay containing less than 450 parts per million of dissolved silicate, expressed as SiO₂, and at a pH in the range 5 to 9 and (ii) a weakly positively charged inorganic hydroxy polymer of aluminum in a quantity such that there is present in the mixture from 0.5 to 10.0 mg of aluminum per gram of clay, calculated on a dry weight basis; the inorganic hydroxy polymer of aluminum being represented by the formula:

$$Al(OH)_n \cdot (3-n)X^-$$

where $0.5 \leq n \leq 2.8$ and $X^-$ is $Cl^-$, $NO_3^-$ or $\frac{1}{2} SO_4^{2-}$, and being formed by combining an inorganic aluminum salt and a base selected from the group consisting of the carbonates and hydroxides of lithium, sodium and potassium.

2. A method according to claim 1, wherein there is formed a mixture of said aqueous suspension of the clay containing less than 30% by weight of clay solids and from 1.0 to 7.0 mg of aluminum per gram of dry clay.

3. A method according to claim 1, wherein the pH of said suspension of the clay is in the range, or is adjusted to be in the range, 6.0 to 8.0.

4. A method according to claim 1, wherein the inorganic hydroxy polymer of aluminum is formed in situ in the mixture.

5. A method according to claim 1, wherein said mixture is formed by adding to said aqueous suspension of the clay said aluminum salt followed by said alkali so as to raise the pH of the aqueous medium to at least 5.0 and thus precipitate the inorganic hydroxy polymer of aluminum, and wherein the addition of sufficient of said alkali to raise the pH of the aqueous medium to at least 5.0 occurs not more than about 10 hours after the addition of said aluminum salt to said aqueous clay suspension.

6. A method according to claim 1, wherein the aqueous suspension of the clay has a dissolved silicate content of less than 200 ppm, expressed as SiO₂.

7. A method according to claim 1, wherein said aqueous suspension of the clay is treated so as to have a dissolved silica content, before it is formed into a mixture with said hydroxy polymer of aluminum, of less than 200 ppm, expressed as SiO₂.

8. A method according to claim 1, wherein said aqueous clay suspension is subjected to a reducing bleaching process concurrently with the formation of the mixture of the aqueous clay suspension and the inorganic hydroxy polymer of aluminum.

9. A method according to claim 1, wherein said aqueous clay suspension is subjected to a reducing bleaching process prior to the formation of the mixture of said aqueous clay suspension and the inorganic hydroxypolymer of aluminum.

10. A method according to claim 1, wherein the clay solids content of said aqueous suspension of the clay is adjusted to be in the range of from 5 to 20% by weight solids.

11. A method according to claim 1, wherein the mixture of said aqueous suspension of the clay and inorganic hydroxy polymer is dewatered and the product thus obtained is resuspended in clean water and then dewatered.

12. A method according to claim 1, wherein before said aqueous suspension of the clay is formed into a mixture with the hydroxy polymer of aluminum it is subjected in the form of a plastic mass to mechanical working under conditions resulting in the dissipation in the clay of at least 50 horsepower hours of energy per ton of dry clay.

13. A method according to claim 1, wherein said mixture is formed into a plastic mass and then subjected to mechanical working under conditions resulting in the dissipation in the clay of at least 50 horsepower hours of energy per ton of dry clay.

14. A method of treating a kaolinitic clay comprising at least 70% by weight of particles smaller than 2 microns equivalent spherical diameter in order to improve the rheological properties of the clay which method comprises the steps of (a) forming a mixture of (i) an aqueous suspension of the clay which contains less than 450 parts per million of dissolved silicate, expressed as $SiO_2$, which is at a pH in the range 6 to 8 and which has a solids content in the range 5 to 20% by weight solids, and (ii) a weakly positively charged inorganic hydroxy polymer of aluminum which can be represented by the formula:

$$Al(OH)_n \cdot (3-n)X^-$$

where $0.5 \leq n \leq 2.8$ and $X^-$ is $Cl^-$, $NO_3^-$ or $\frac{1}{2}SO_4^{2-}$, is present in a quantity such that the mixture contains from 1.0 to 7.0 mg of aluminum per gram of clay (calculated on a dry weight bases) and is formed by combining an inorganic aluminum salt and a base selected from the group consisting of the carbonates and hydroxides of lithium, sodium and potassium, (b) dewatering the mixture thus obtained, (c) resuspending in clean water the dewatered mixture of clay and hydroxy polymer of aluminum, and (d) dewatering the resuspended mixture.

15. A method according to claim 14 wherein the dewatered resuspended mixture, obtained on carrying out step (d), is dried at a temperature not greater than 120° C.

16. A method according to claim 14, wherein the dewatered resuspended mixture is subjected in the form of a plastic mass to mechanical working for a time sufficient to dissipate in the clay at least 50 horsepower hours of energy per long ton of dry clay.

17. A method according to claim 14, wherein the aqueous suspension of the clay has a dissolved silicate content of less than 200 ppm, expressed as $SiO_2$.

18. A method according to claim 14, wherein the aqueous suspension of the clay is treated so as to have a dissolved silica content, before it is formed into a mixture with said hydroxy polymer of aluminum, of less than 200 ppm, expressed as $SiO_2$.

19. A method according to claim 14, wherein said mixture is formed by adding to the aqueous suspension of the clay said aluminum salt followed by said alkali so as to raise the pH of the aqueous medium to at least 6.0 and thus precipitate the inorganic hydroxy polymer of aluminum, and wherein the addition of sufficient of said alkali to raise the pH of the aqueous medium to at least 6.0 occurs not more than about 10 hours after the addition of said aluminum salt to said aqueous clay suspension.

20. A method according to claim 14, wherein there is formed a mixture of said aqueous suspension of the clay and from 1.0 to 4.0 mg of aluminum per gram of dry clay.

* * * * *